(12) United States Patent
Liu (10) Patent No.: US 6,896,275 B1
(45) Date of Patent: May 24, 2005

(54) FOLDING COLLAPSIBLE FRAME STRUCTURE FOR BABY TRAILER

(76) Inventor: Ssu-Liu Liu, 2F., No. 44, Lane 11, Kuang Fu N. Rd., Taipei (TW)

(*) Notice: Subject to any disclaimer, the term of this patent is extended or adjusted under 35 U.S.C. 154(b) by 150 days.

(21) Appl. No.: 10/438,835

(22) Filed: May 16, 2003

(51) Int. Cl.[7] .............................................. B62K 27/12
(52) U.S. Cl. ...................... 280/204; 280/292; 280/656
(58) Field of Search ................................ 280/204, 202, 280/292, 642, 647, 650, 656, 657, 658, 655, 280/63, 655.1, 42, 47.26, 47.38, 47.131, 280/47.315, 47.371, 87.021; 403/68, 83, 403/84, 92, 93, 326, 328, 329; 24/194, 196, 24/615, 616, 625

(56) References Cited

U.S. PATENT DOCUMENTS

| | | | | |
|---|---|---|---|---|
| 4,765,766 A | * | 8/1988 | Heitmann et al. ............. 401/48 |
| 4,921,370 A | * | 5/1990 | Handler et al. .............. 403/234 |
| 5,020,814 A | * | 6/1991 | George et al. ............... 280/204 |
| 5,375,286 A | * | 12/1994 | Harrah ....................... 15/147.1 |
| 5,669,618 A | * | 9/1997 | Chiu ........................... 280/204 |
| 5,783,333 A | * | 7/1998 | Mayer ........................ 429/223 |
| 5,829,770 A | * | 11/1998 | Chiu ........................... 280/204 |
| 5,829,771 A | * | 11/1998 | Hsu ............................ 280/204 |
| 5,921,571 A | * | 7/1999 | Bell ............................ 280/204 |
| 5,979,921 A | * | 11/1999 | Derven et al. .............. 280/204 |
| 6,053,518 A | * | 4/2000 | Chiu ........................... 280/204 |
| 6,311,598 B1 | * | 11/2001 | Osborne ....................... 83/745 |
| 6,568,874 B1 | * | 5/2003 | Sommerfeld et al. ........ 403/321 |
| 6,575,485 B2 | * | 6/2003 | Durrin ........................ 280/204 |
| 6,698,966 B2 | * | 3/2004 | Hilton et al. ............... 403/321 |
| 6,705,628 B2 | * | 3/2004 | Kahmann .................... 280/204 |

* cited by examiner

Primary Examiner—Christopher P. Ellis
Assistant Examiner—Bridget Avery
(74) Attorney, Agent, or Firm—Troxell Law Office, PLLC (57) ABSTRACT

A folding collapsible frame structure for baby trailer is disclosed to include a bottom frame unit having a transverse front bar curved downwards without hindering movement of a young child in and out of the baby trailer, two upright side frames, respectively pivoted to the bottom frame unit at two sides, a transverse top bar, male and female coupling members respectively provided at the upright side frames and the ends of the transverse top bar for enabling the transverse top bar to be detachably connected between the upright side frames, a trailer bar pivoted to a bottom U-lug at the bottom frame unit and selectively locked between the extended position and the received position by a spring-supported locking member, which is coupled to the trailer bar by a slip joint.

2 Claims, 10 Drawing Sheets

FOLDING COLLAPSIBLE FRAME STRUCTURE FOR BABY TRAILER

BACKGROUND AND SUMMARY OF THE INVENTION

The present invention relates to a baby trailer to be pulled by a baby tricycle or the like and, more particularly, to a folding collapsible frame structure for baby trailer, which has the transverse front bar of the bottom frame unit thereof curved downwards so that a young child can conveniently move in and out of the baby trailer without kicking the transverse front bar and, which enables the trailer bar to be automatically locked when moved to the extended or received position.

Various folding collapsible baby trailers have been disclosed, and have appeared on the market. However, conventional folding collapsible baby trailers are still not satisfactory in function. When getting on/off the baby trailer, the young child's lets tend to kick or hook on the front transverse rod member. Further, because a lock pin is used to selectively lock the handle between the extended position and the received position, the user may forget to install the lock pin after the handle has been moved to the extended position. If the handle is not locked when pulling the baby trailer, an accident may occur The present invention has been accomplished to provide a folding collapsible baby trailer, which eliminates the aforesaid problem. According to one aspect of the present invention, the folding collapsible baby trailer is comprised of a bottom frame unit carrying a pair of wheels, two upright side frames respectively pivoted to the bottom frame unit at two sides, a transverse top bar detachably connected between the upright side frames at the top, and a trailer bar pivoted to a bottom U-lug at one side of the bottom frame unit and selectively locked between the extended position and the received position. The bottom frame unit has a transverse front bar, which has a middle section curved downwards without hindering movement of a young child in and out of the baby trailer. According to another aspect of the present invention, the trailer bar is pivoted to the bottom U-lug at the bottom frame unit, and selectively locked between the extended position and the received position by a spring-supported locking member, which is coupled to the trailer bar by a slip joint.

DETAILED DESCRIPTION OF THE INVENTION

Referring to FIGS. 1~10, a folding collapsible frame structure for baby trailer is shown comprising a bottom frame 1, a first upright side frame 2, a second upright side frame 3, a transverse top bar 4, and a trailer bar 5.

The bottom frame unit 1 comprises two wheel holders 11 and 12 symmetrically located on two opposite lateral sides thereof and carrying a respective wheel 6, a transverse front bar 15, a transverse rear bar 16, and a bottom U-lug 13 longitudinally disposed at the bottom of one lateral side adjacent to the transverse front bar 15. The bottom U-lug 13 has two parallel sidewalls 131. The sidewalls 131 each have a first locating notch 132 and a second locating notch 133. The first locating notch 132 has a retaining portion 1321. The second locating notch 133 has a retaining portion 1331. The drag bar 5 has one end 51 pivotally connected between the two sidewalls 131 of the U-lug 13 by a pivot bolt 14 (see FIG. 8). The transverse front bar 15 has a middle section 151 curved downwards so that a young child can get on/off the baby trailer without kicking the transverse front bar 15.

Figure 2:
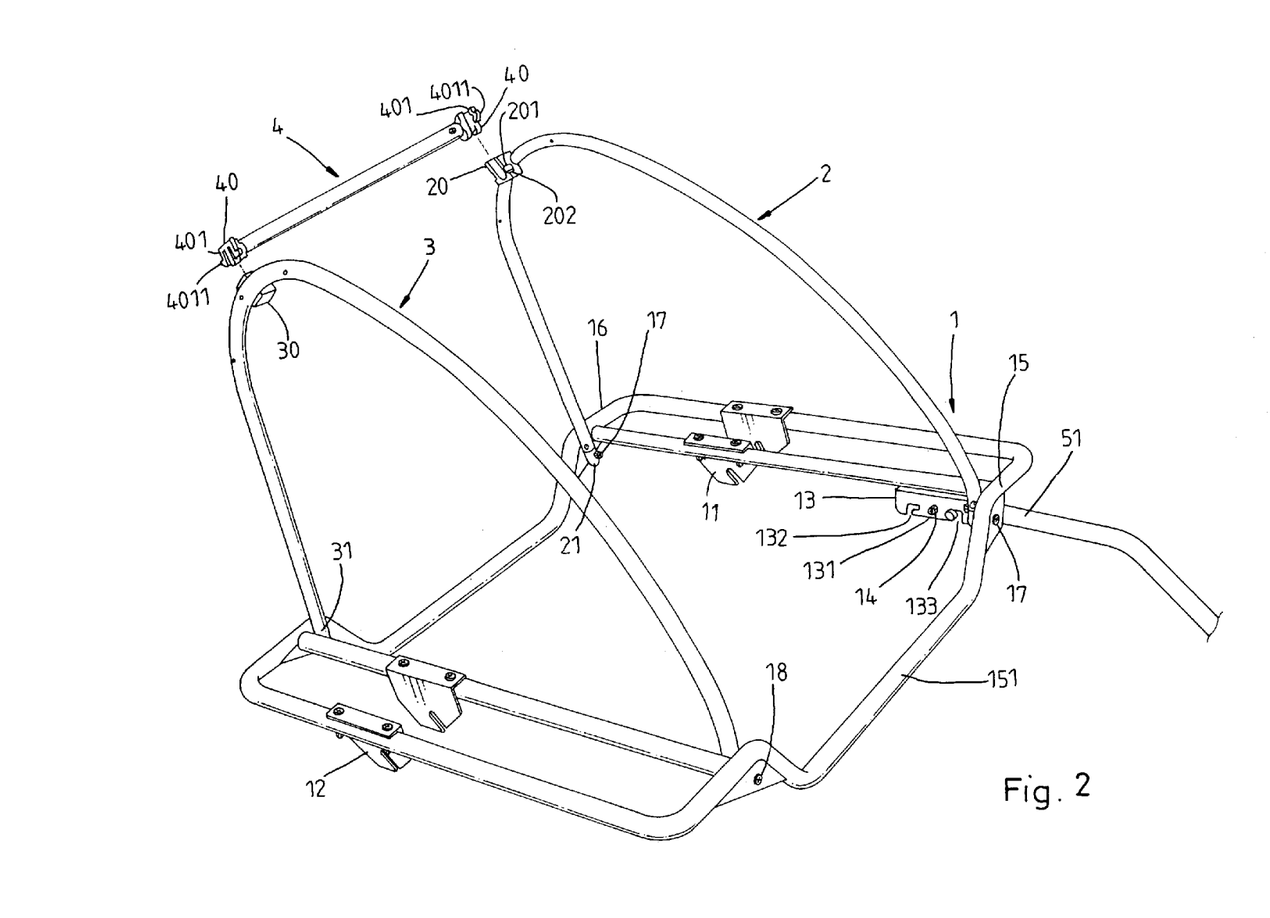
FIG. 2 is another elevational view of the folding collapsible frame structure for baby trailer according to the present invention, showing the transverse top bar disconnected from the upright side frames.
Figure 3:
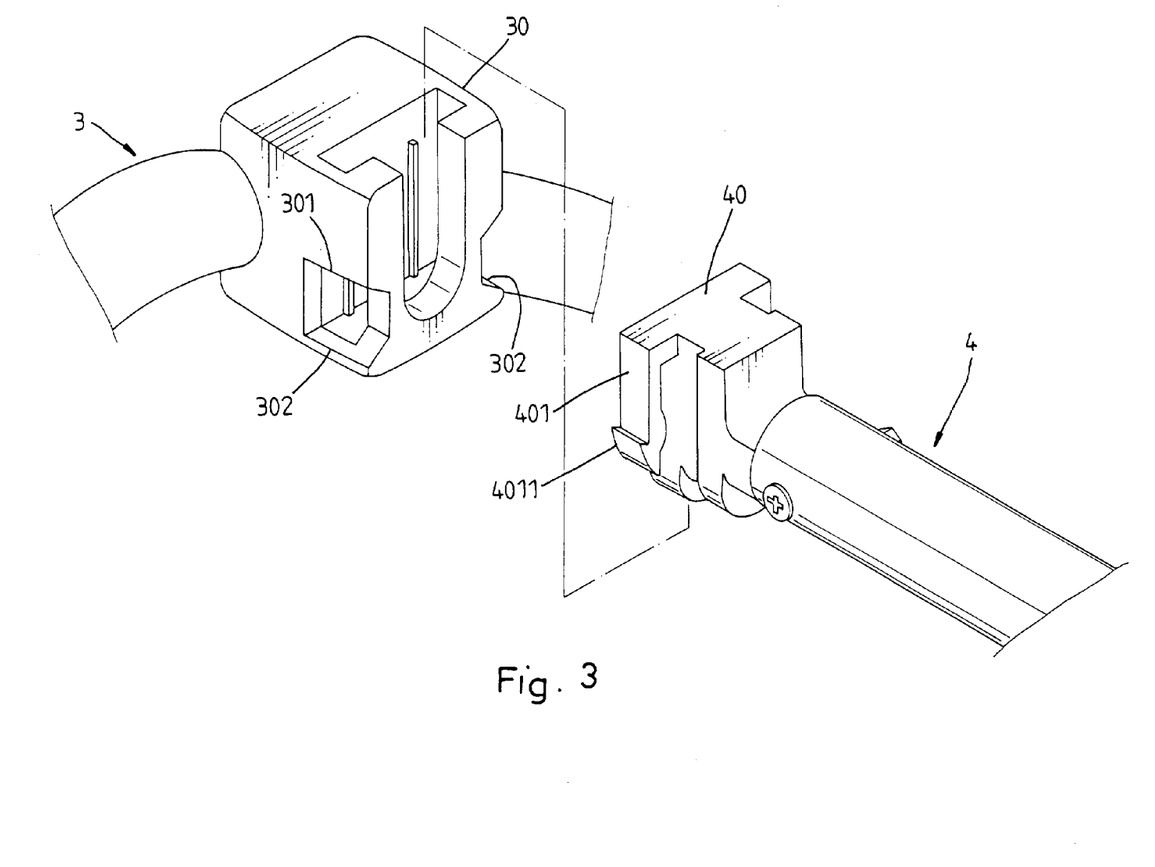
FIG. 3 is an exploded view in an enlarged scale of a part of the present invention, showing the relationship between the female coupling device at one upright side frame and the male coupling device at one end of the transverse top bar.
Figure 4:
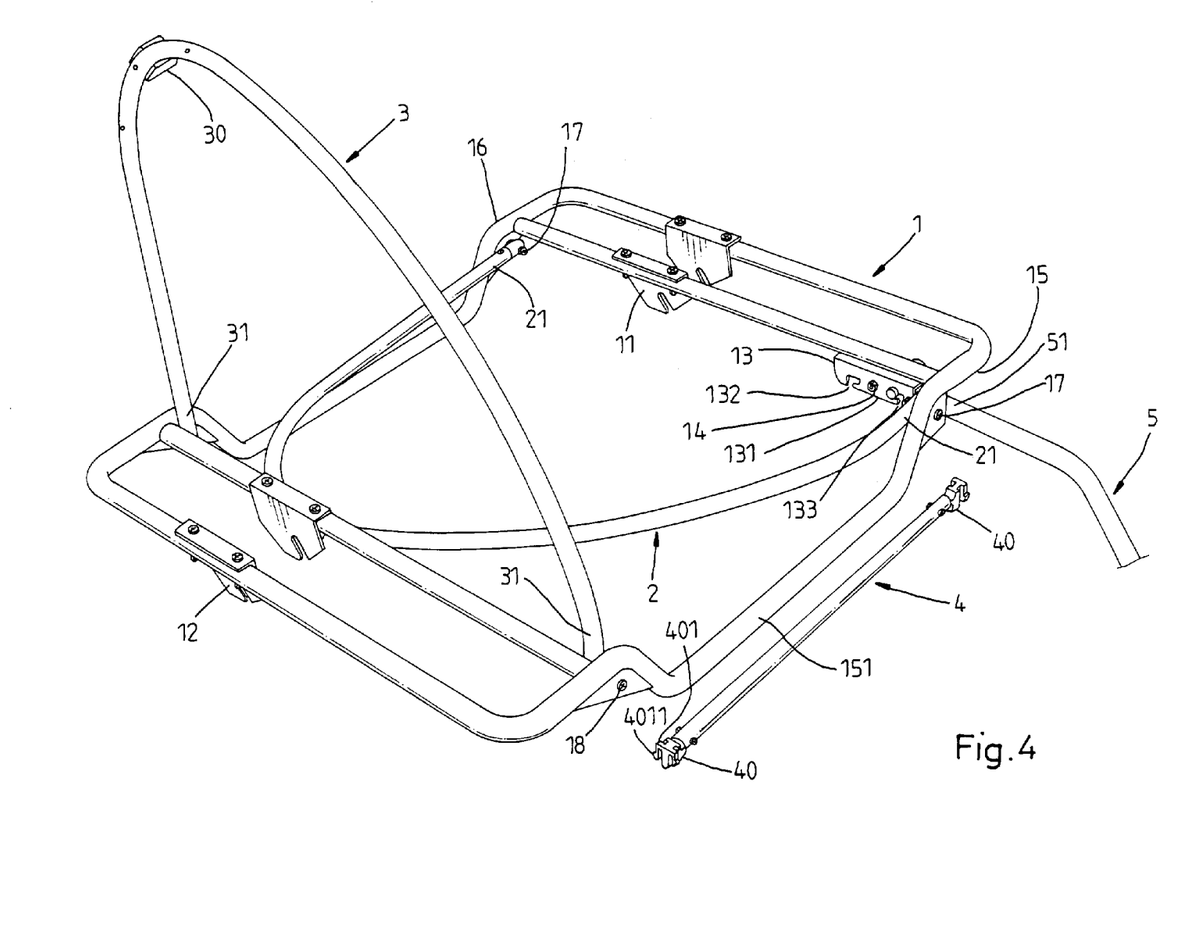
FIG. 4 illustrates the folding operation of the present invention where the first upright side frame collapsed and attached to the bottom frame unit.
Figure 5:
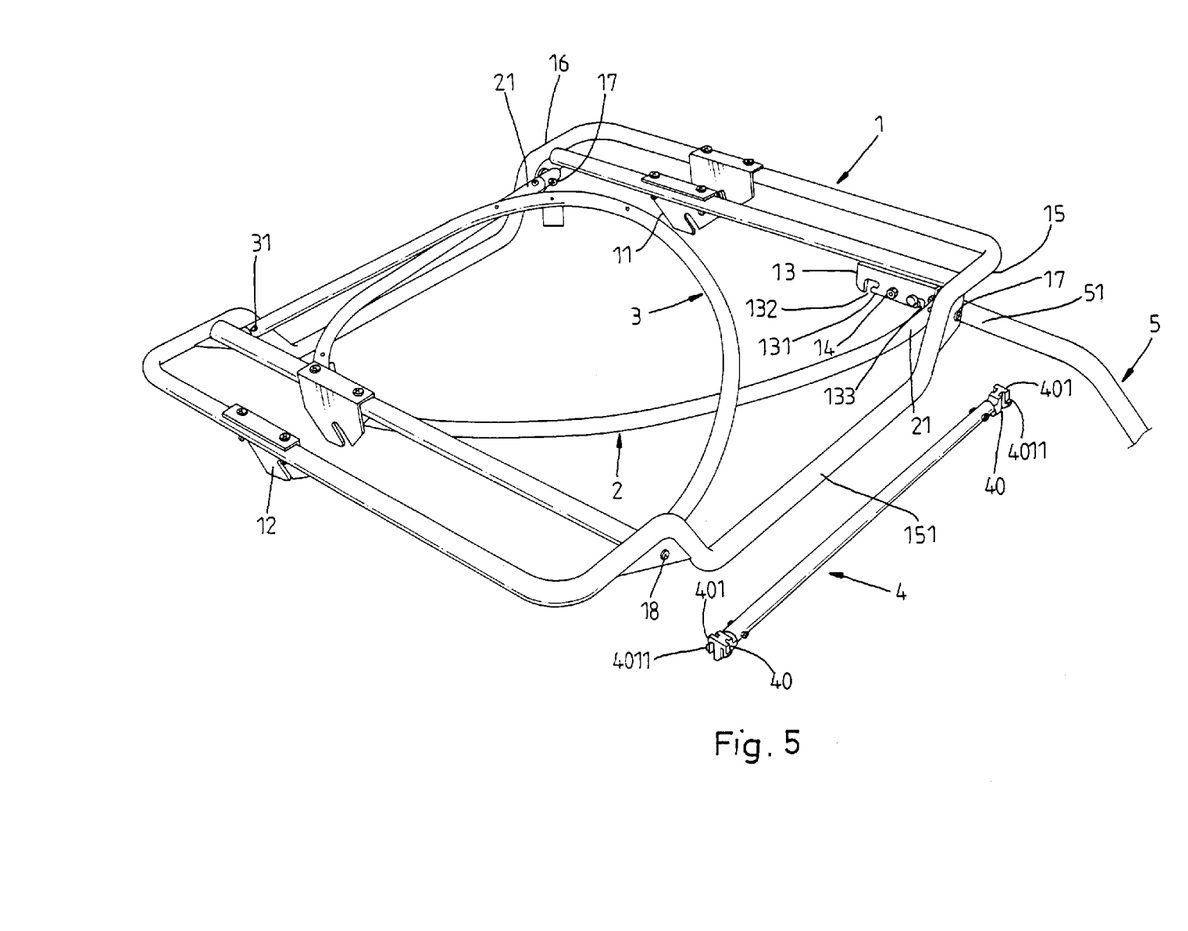
FIG. 5 is similar to FIG. 4 but showing the second upright side frame collapsed and attached to the first upright side frame.

The two upright side frames 2 and 3 are substantially arch-shaped frame tubes, each having two bottom ends 21 or 31 respectively pivoted to the bottom frame unit 1 by pivots 17 and 18, and a top side fixedly provided with a respective female coupling device 20 or 30 (see FIGS. 2 and 3). The female coupling devices 20 or 30 comprises a coupling hole 201 or 301, and two retaining holes 202 or 302 disposed at two sides of the coupling hole 201 or 301.

The transverse top bar 4 comprises two male coupling devices 40 at the two ends for coupling to the female coupling devices 20 and 30 at the upright side frames 2 and 3. Each male coupling block 40 comprises an elastic front coupling block 401 for detachably engaging into the coupling hole 201 or 301. The elastic front coupling block 401 has two hooked portions 4011 for hooking in the retaining holes 202 or 302.

Figure 1:
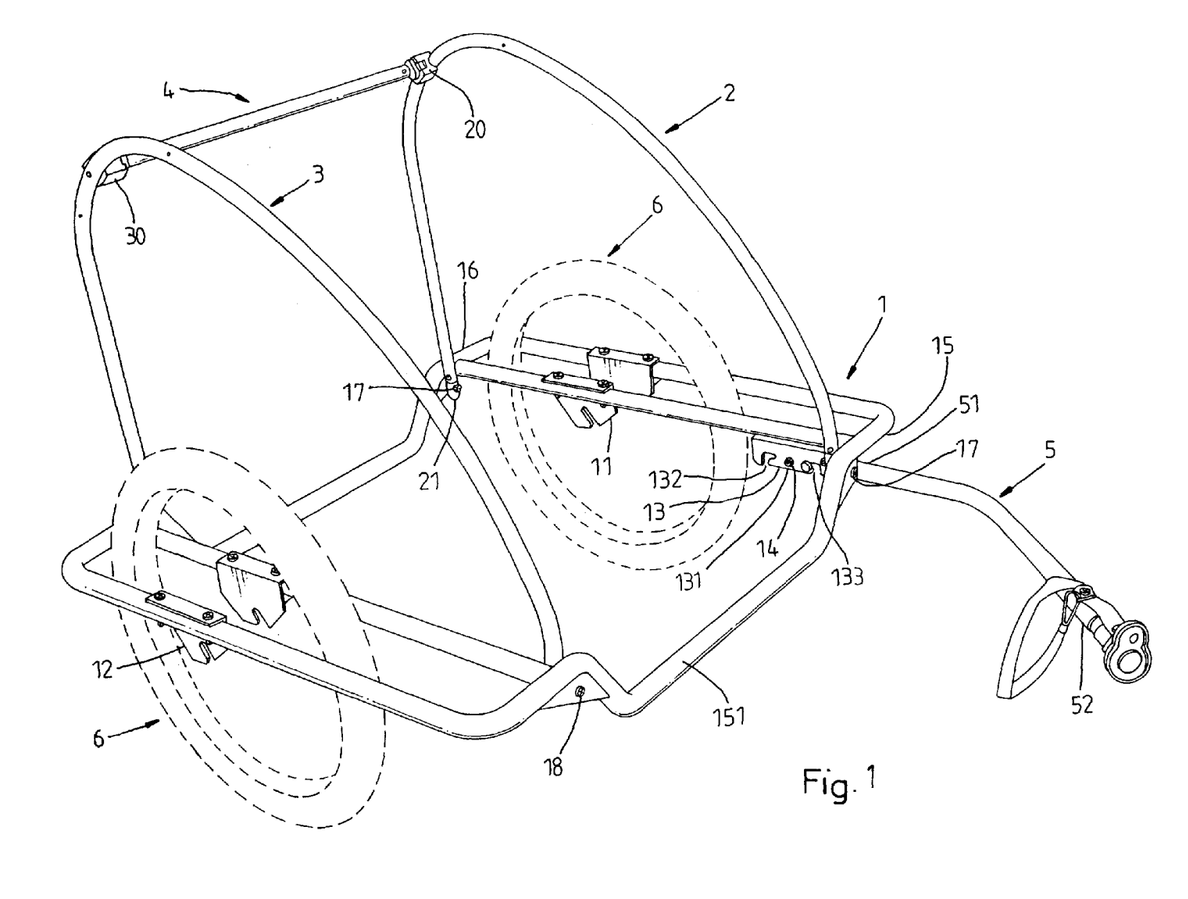
FIG. 1 is an elevational view of the frame structure of a folding collapsible frame structure for baby trailer according to the present invention.

As indicated above, the trailer bar 5 has one end, namely, the rear end 51 pivotally connected to the lug 13 of the bottom frame unit 1 by a pivot bolt 14. The other end, namely, the front end 52 of the trailer bar 5 is connectable to a baby bicycle or tricycle (not shown). The trailer bar 5 is turned about the pivot 14 between the extended position (see FIGS. 1~6) and the received position (see FIGS. 7~9). A lock pin is selectively inserted into the front locating holes or rear locating holes to lock the trailer bar 5 in the extended or received position. The trailer bar 5 further comprises a longitudinal sliding slot 511 in the rear end 51, a locking member 512, the locking member 512 having a head 5121 and a knob 5122 at two ends of a shank 5120 thereof, and a spring member 514 stopped between a stop portion 513 inside the trailer bar 5 and the shank 5120 of the locking member 512 (see FIGS. 7 and 10). The spring member 514 pushes the shank 5120 to one end, namely, the rear end of the sliding slot 511. When pulling the locking member 512 away from the rear end of the sliding slot 511 toward the front end of the sliding slot 511 to compress the spring member 514, the locking member 512 is disengaged from the retaining portion 1321 of the first locating notch 132 in each sidewall 131 of the bottom U-lug 13 or the retaining portion 1331 of the second locating notch 133 in each sidewall 131 of the bottom U-lug 13, for enabling the trailer bar 5 to be turned about the pivot bolt 14 between the extended position as shown in FIG. 1 and the received position as shown in FIG. 9. When the trailer bar 5 turned to the received or extended position, the shank 5120 is pushed into the second locating notches 133 or first locating notches 132 in the sidewalls 131 of the bottom U-lug 13, and forced into engagement with the respective retaining portions 1321 and 1331 by the spring member 514.

Figure 6:
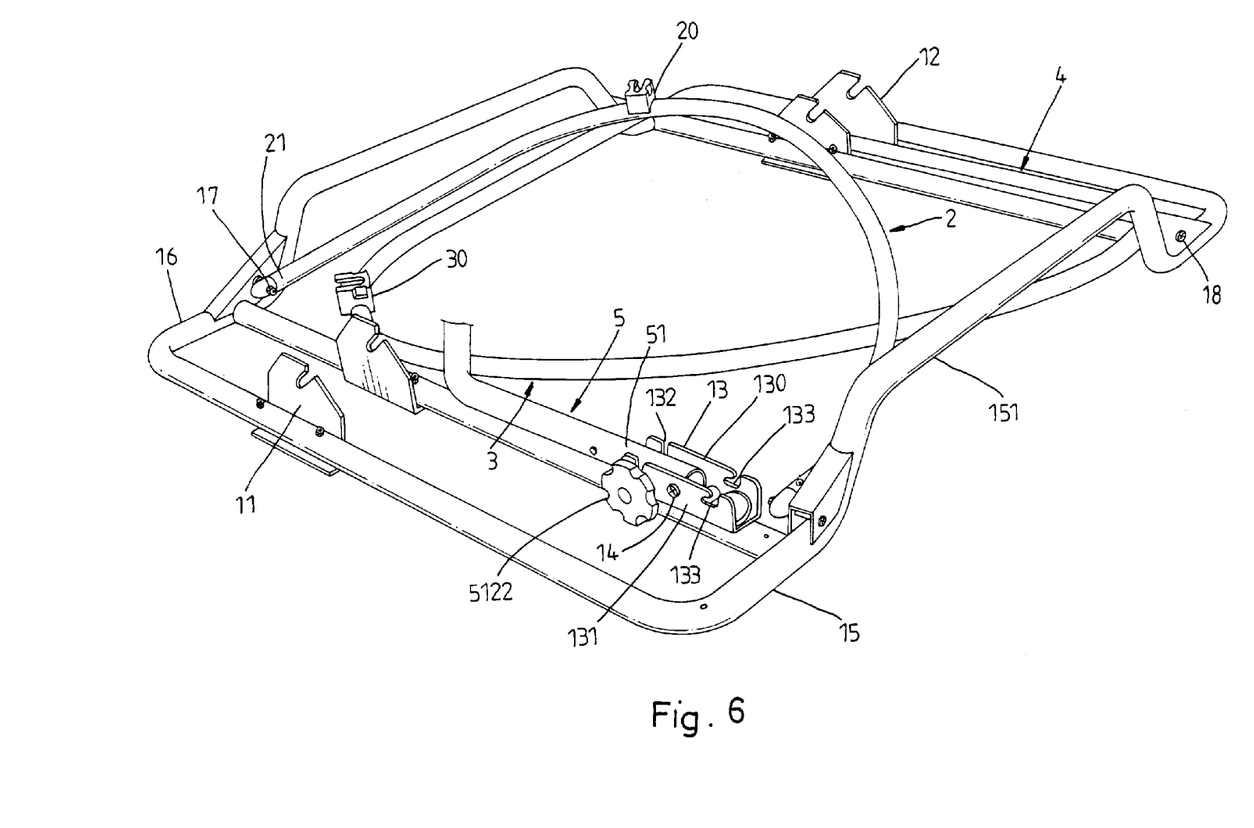
FIG. 6 is an oblique bottom view of FIG. 5.
Figure 7:
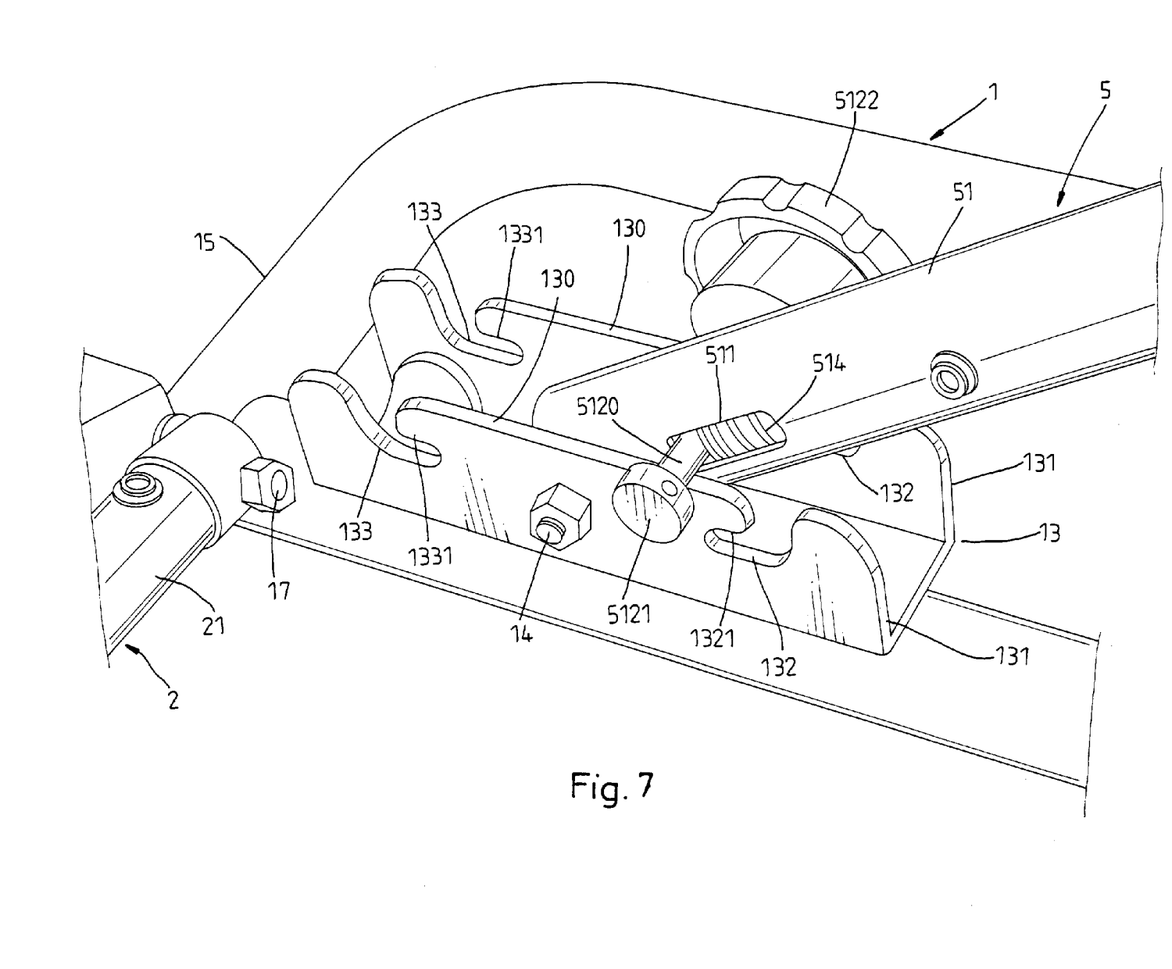
FIG. 7 is an enlarged view of a part of the present invention, showing the trailer bar unlocked.
Figure 8:
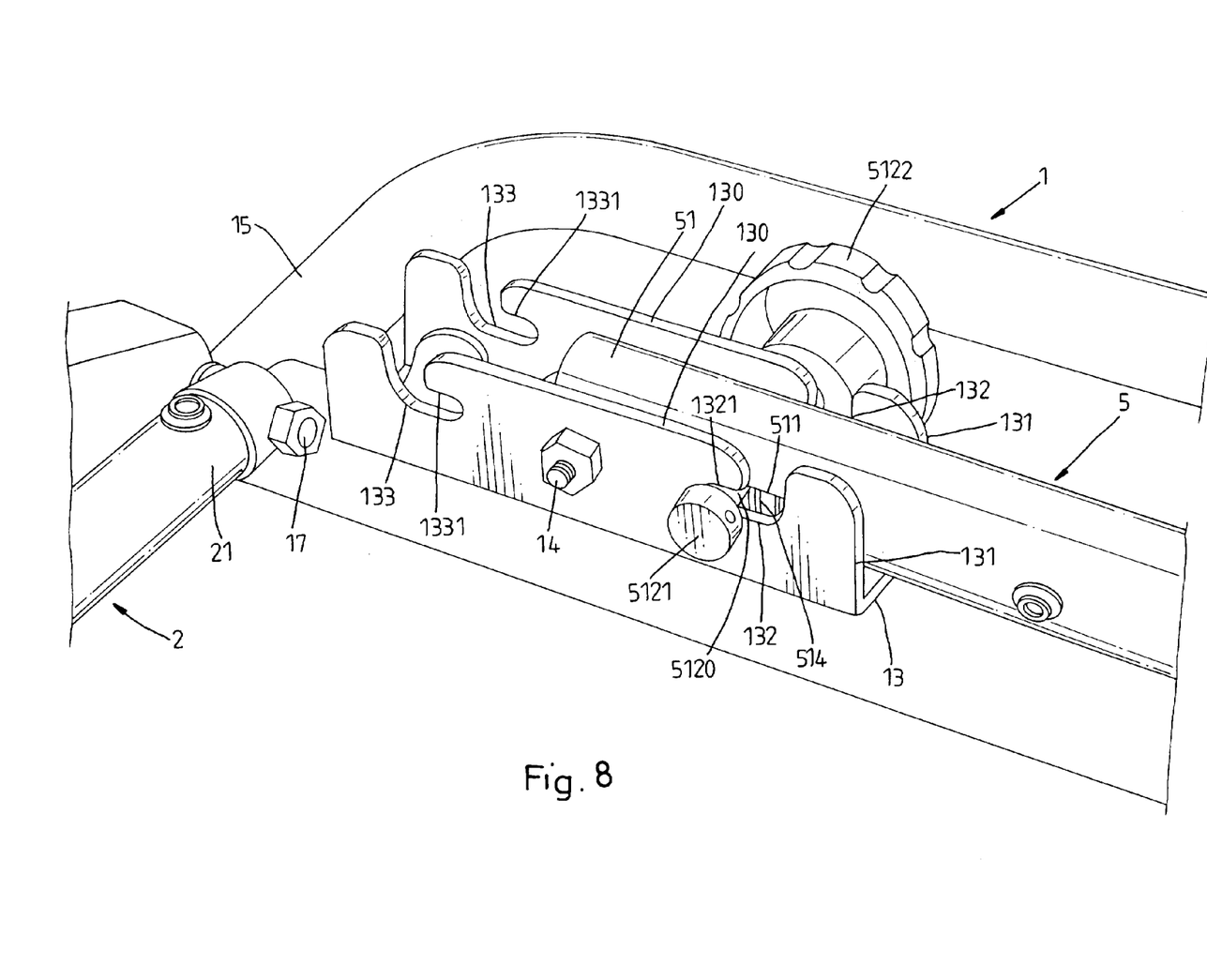
FIG. 8 is similar to FIG. 7 but showing the trailer bar locked in the received position.
Figure 9:
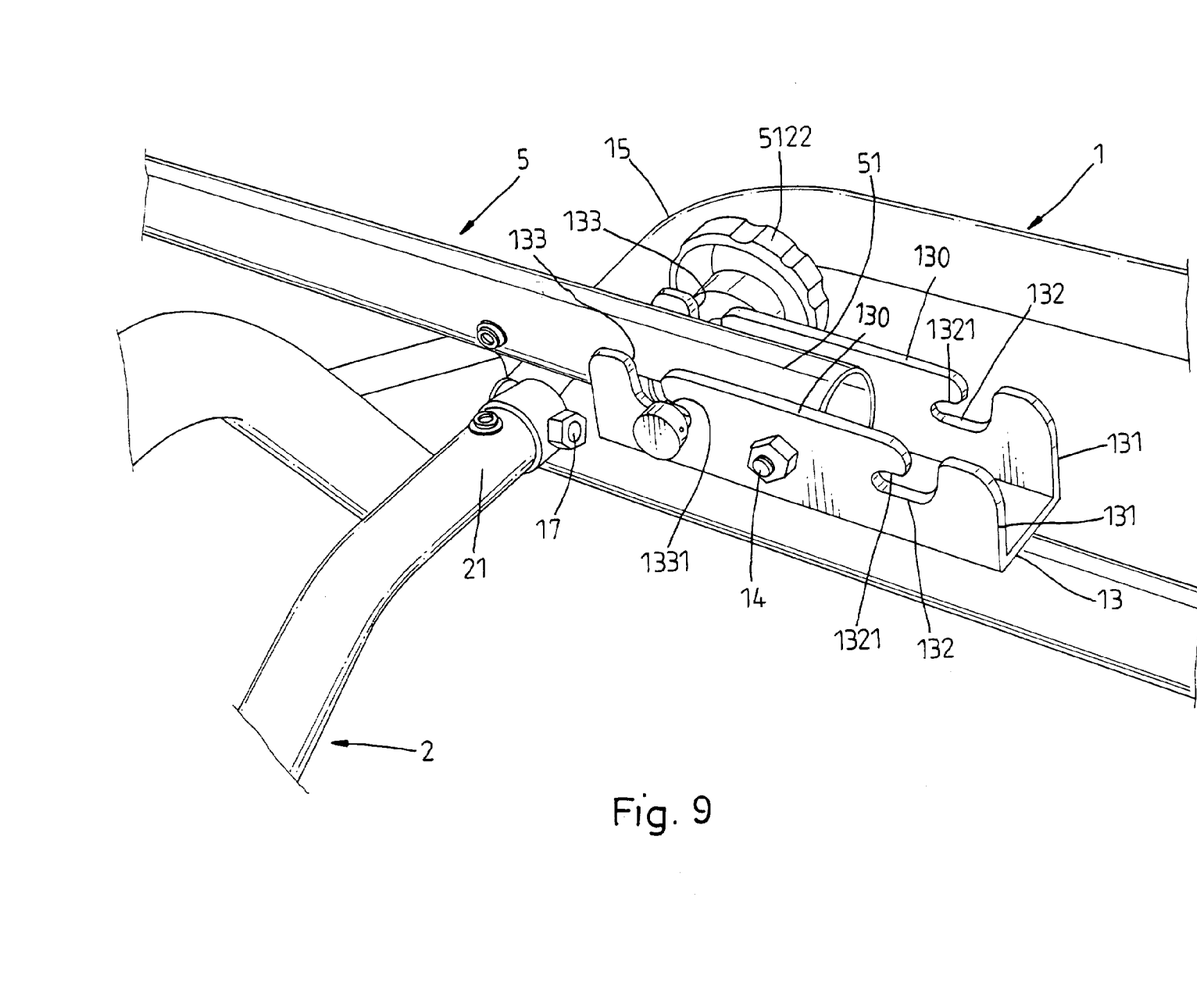
FIG. 9 illustrates the trailer bar locked in the extended position according to the present invention.
Figure 10:
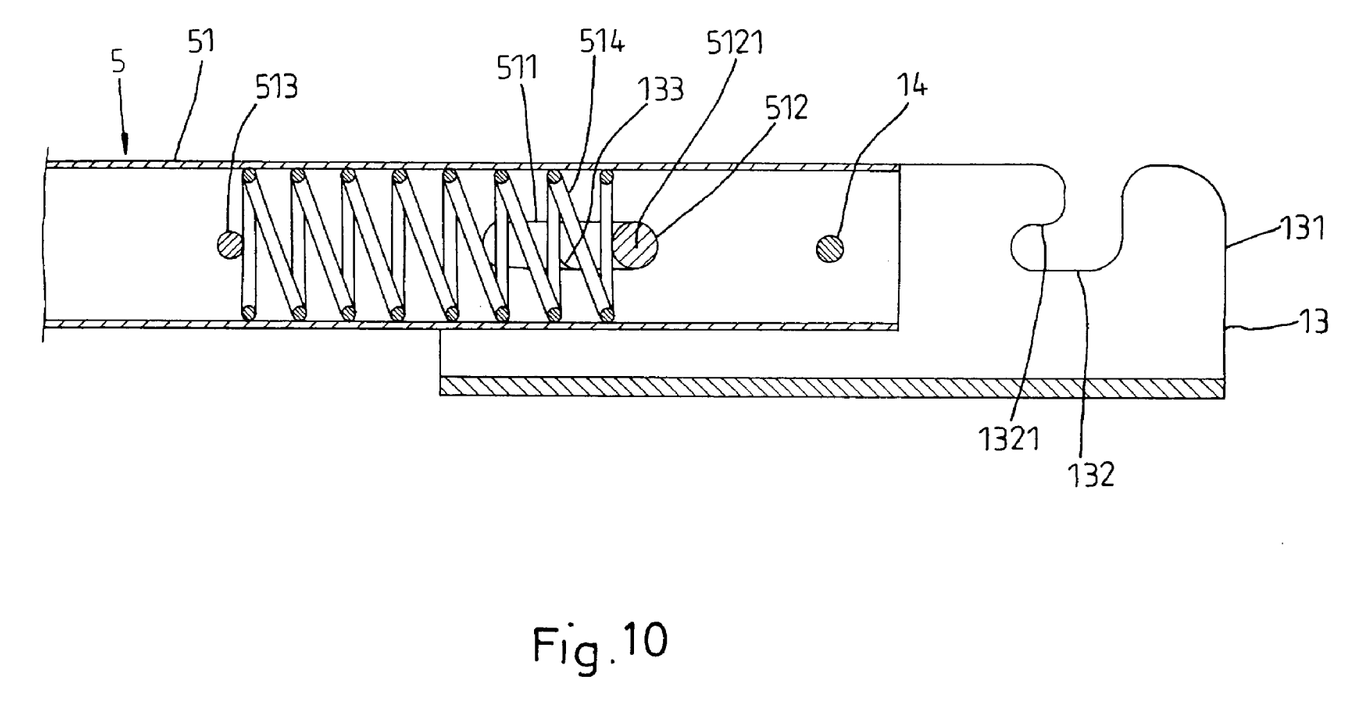
FIG. 10 is a sectional view in an enlarged scale of a part of the present invention, showing the locking member stopped between one end of the longitudinal sliding slot of the trailer bar and one end of the spring member.

When wishing to collapse the folding collapsible frame structure, disconnect the transverse top bar 4 from the upright side frames 2 and 3 by squeezing the hooked portions 4011 inwardly away from respective retaining holes 202 and 302 to disengage the male coupling devices 40 from the female coupling devices 20 and 30 (see FIG. 2), and then the upright side frames 2 and 3 are respectively turned downwards and closely attached to each other on the bottom frame unit 1 (see FIGS. 4 and 5), and then the locking member 512 is disengaged from the second locating notches 133 in the sidewalls 131 of the bottom U-lug 13 and moved with the trailer bar 5 along the topmost edge 130 of each sidewall 131 of the bottom U-lug 13 (see FIG. 7) into the first locating notches 132 and forced by the spring member 514 into engagement with the respective retaining portions 1321 (see FIGS. 6 and 8). If necessary, the wheels 6 may be detached from the wheel holders 11 and 12 and put on the collapsed folding collapsible frame structure for packing.

As indicated above, the invention has the following advantages:

1. Because the transverse front bar 15 has a middle section curved downwards, a young child can conveniently get on or off the baby trailer without kicking the transverse front bar 15.
2. The locking member 512 can conveniently be operated to selectively lock the trailer bar 5 between the extended position and the received position. Because the locking member 512 is coupled to the trailer bar 5, it does not drop from the trailer bar 5 and, the user needs not to remove the locking bar 512 from the trailer bar 5 when unlocking the trailer bar 5.

What is claimed is:

1. A folding collapsible frame structure for baby trailer comprising:

a bottom frame unit, said bottom frame unit comprising two wheel holders provided at two opposite lateral sides thereof and carrying a respective wheel, a transverse front bar disposed at a front side thereof, said transverse front bar having a middle section curved downwards, a bottom U-lug affixed to one lateral side thereof at a bottom side adjacent to said transverse front bar, said bottom U-lug comprising two parallel sidewalls, said parallel sidewalls each having a first locating notch and a second locating notch near two distal ends thereof, said first locating notch and said second locating notch each having a retaining portion;

two upright side frames respectively formed of a substantially arch-shaped frame bar, said upright side frames each having two bottom ends respectively pivoted to said bottom frame unit and a top side respectively fixedly mounted with a female coupling member, said female coupling member comprising a coupling hole and two retaining holes in communication with said coupling hole at two sides;

a transverse top bar detachably connected between said upright side frames, said transverse top bar having two male coupling members respectively located on two distal ends thereof and detachably coupled to the female coupling members of said upright side frames, said male coupling members each comprising a coupling block respectively coupled to the coupling holes of the female coupling members at said upright side frames, said coupling block having two hooked portions for hooking in the retaining holes of the corresponding female coupling member;

a pivot bolt transversely fastened to the parallel sidewalls of said bottom U-lug;

a trailer bar pivoted to said pivot bolt at said bottom U-lug of said bottom frame unit and selectively locked between an extended position and a received position, said trailer bar having a rear end pivoted to a channel in said bottom U-lug at one side bar of said bottom frame and a front end connectable to a vehicle, a rear end inserted into said bottom U-lug and pivoted to said pivot bolt between the two parallel sidewalls of said bottom U-lug, and a longitudinal sliding slot formed in said rear end adjacent to said pivot bolt;

a locking member slidably coupled to said longitudinal sliding slot for selectively engaging in the first locating notches or second locating notches of said bottom U-lug to lock said trailer bar between said extended position and said received position; and a spring member mounted inside said trailer bar and partially suspended in said longitudinal sliding slot and stopped against said locking member to push said locking member toward one end of said longitudinal sliding slot for forcing said locking member is into engagement with the respective retaining portions when said locking member pushed into the first locating notches or second locating notches of said bottom U-lug by the user.

2. The folding collapsible frame structure for baby trailer as claimed in claim 1, wherein said locking member comprises a shank inserted through said longitudinal sliding slot, a head at one end of said shank, and a knob at an opposite end of said shank.

* * * * *